Figure 1:
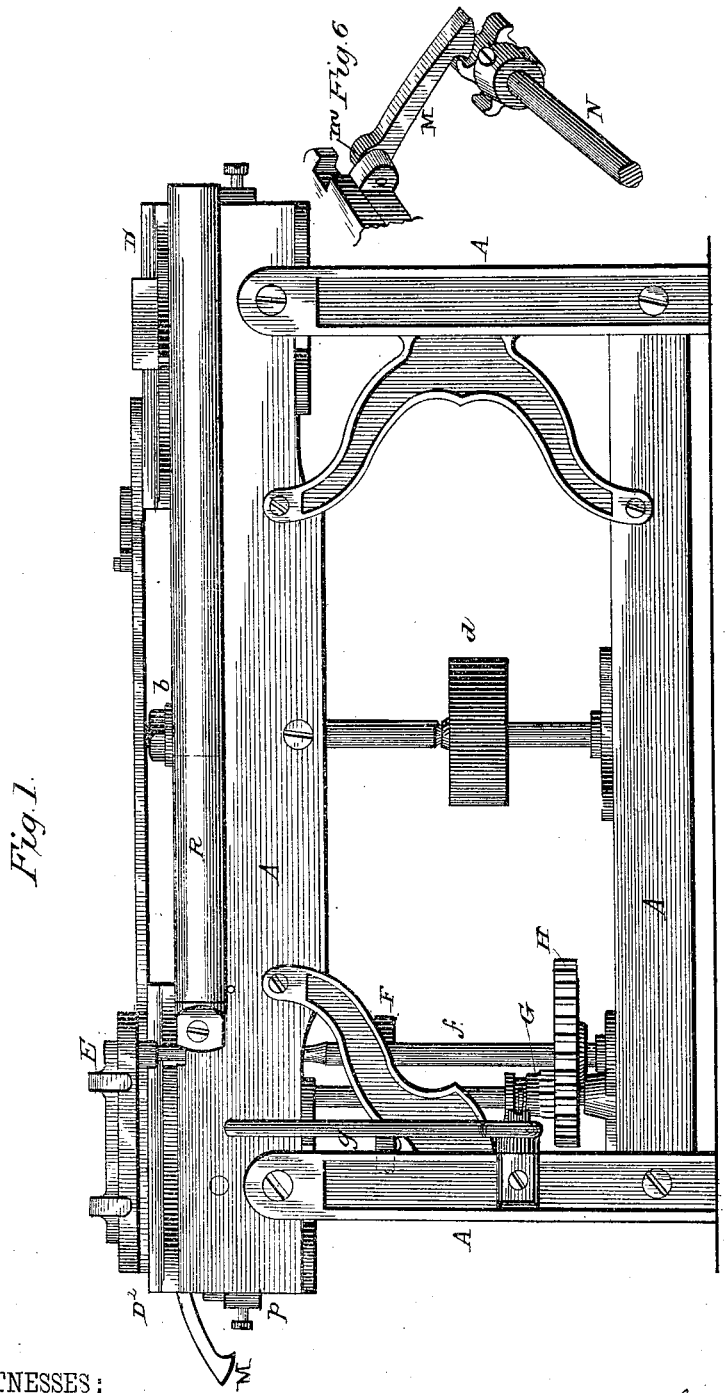

(No Model.) 3 Sheets—Sheet 1.

C. J. WELD.
SHINGLE MACHINE.

No. 273,650. Patented Mar. 6, 1883.

WITNESSES:

INVENTOR.
ATTORNEY.

(No Model.)  C. J. WELD.  3 Sheets—Sheet 2.
SHINGLE MACHINE.
No. 273,650.  Patented Mar. 6, 1883.
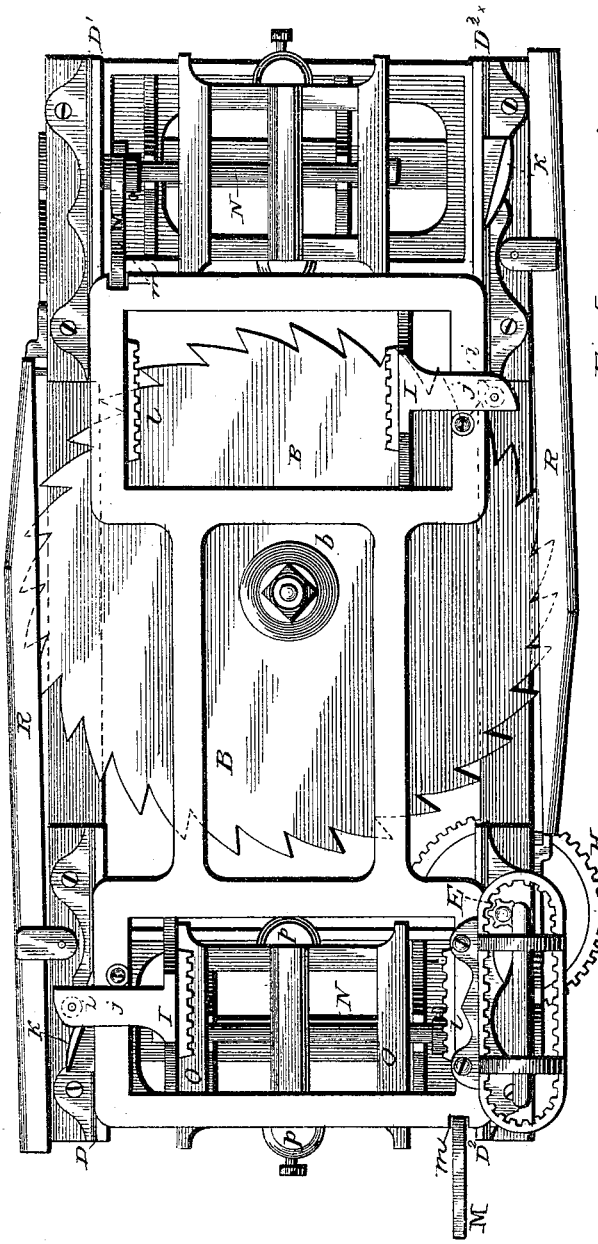
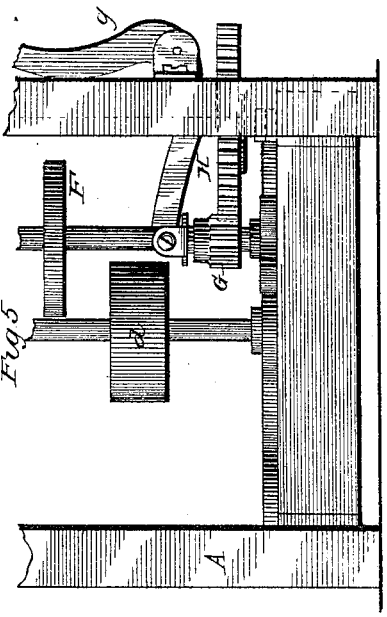
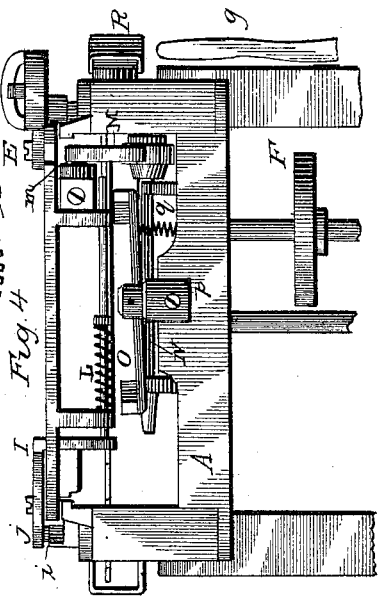
WITNESSES:  INVENTOR.

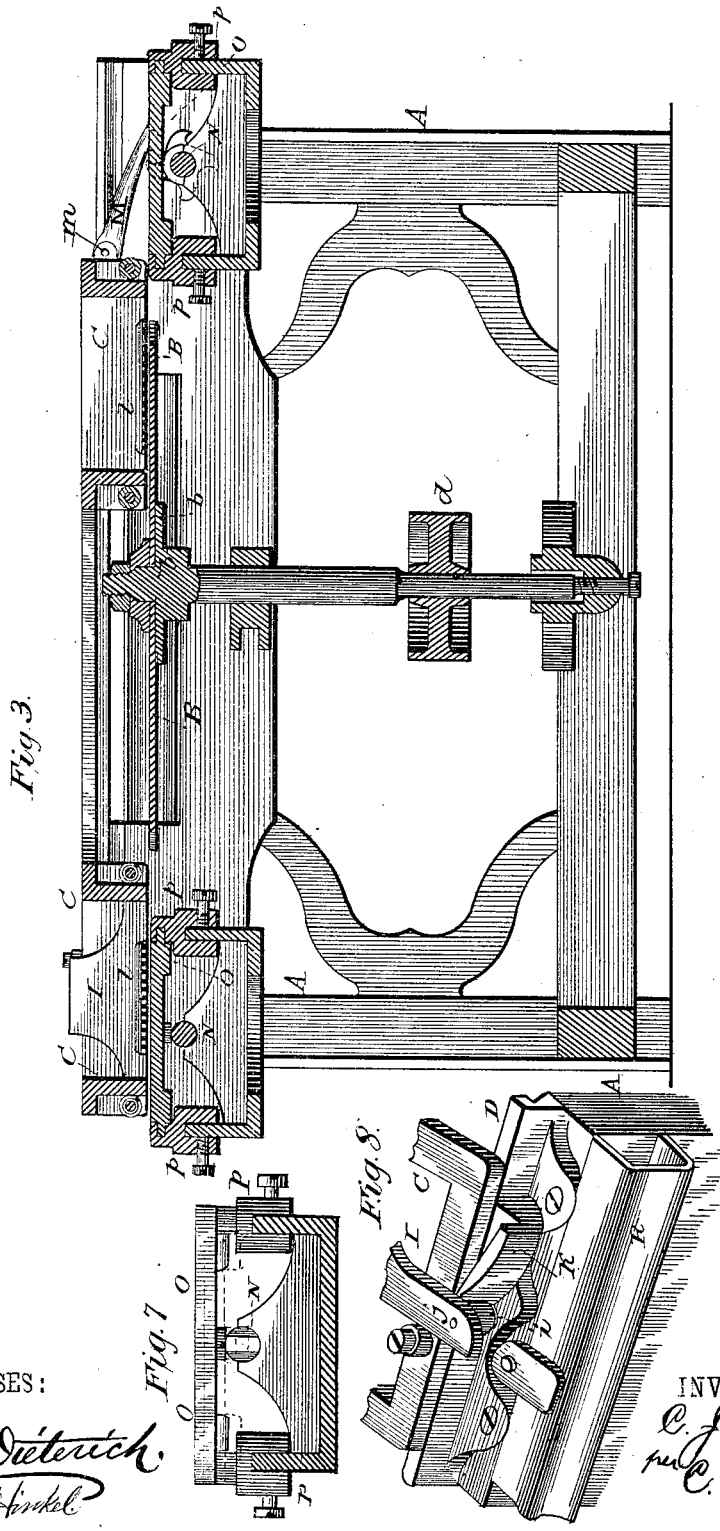

UNITED STATES PATENT OFFICE.

CALVIN J. WELD, OF BRATTLEBOROUGH, VERMONT, ASSIGNOR OF ONE-HALF TO GEORGE W. HOOKER, OF SAME PLACE.

SHINGLE-MACHINE.

SPECIFICATION forming part of Letters Patent No. 273,650, dated March 6, 1883.

Application filed December 2, 1882. (No model.)

*To all whom it may concern:*

Be it known that I, CALVIN J. WELD, a citizen of the United States, residing at Brattleborough, in the county of Windham and State of Vermont, have invented certain new and useful Improvements in Shingle-Machines, of which the following is a specification, reference being had therein to the accompanying drawings.

My invention relates to an improvement in machines for automatically sawing shingles; and it consists, first, in the combination of a circular saw moving horizontally with two or more feed-carriages whose motion is reciprocating, and so arranged as to alternately present the shingle-blocks to the saw; second, in the combination of a movable feed-carriage so constructed as to alternately grip and loosen the shingle-block, with a frame designed to automatically raise and lower alternately the ends of the shingle-blocks as they are presented to the saw; third, in the combination of a circular saw with two or more feed-carriages moving in the same plane, and so constructed that by means of suitable gearing, grips, and levers the blocks are rigidly held while being acted upon by the saw, and then, the grips being loosened, they drop automatically upon a frame which regulates the thickness and cut of the shingles; fourth, in the combination and arrangement of parts, which will be more fully described hereinafter. I attain these objects by the mechanism illustrated in the accompanying drawings, in which similar letters refer to similar parts throughout the several views.

Figure 1 is a side elevation Fig. 2 is a top plan view. Fig. 3 is a vertical longitudinal section. Fig. 4 is an end elevation. Figs. 5, 6, 7, and 8 are detail views.

A represents a frame of suitable construction, designed to sustain the mechanism hereinafter described.

B is a circular saw, which is made to revolve horizontally upon the arbor $b$, which in turn is revolved by the pulley $d$. The arbor is vertically adjustable by means of the set-screw in its lower end.

C C are feed-carriages, which move upon the tracks D D' D D², which rest upon either end of the frame A. They are so connected together as to move reciprocally back and forth over the saw B, motion being communicated to them through the gearing E, power being applied at the pulley F, which revolves the cog-wheels G and H and the gear-shaft $f$. $g$ is a lever for disconnecting the cog-wheels G and H; but I do not limit myself to this or any other mechanism for moving the feed-carriages C C, for this may be done in a number of ways without departing from the spirit of my invention.

I I are movable spring-grips at one end of each of the feed-carriages. They are actuated by the pins $i\ i$ on the under side of their respective arms $jj$ as they come in contact with the beveled projections K K on the corresponding tracks, D D. Their office is to withdraw the grips as the carriage recedes from the saw, the coiled springs L L on either side of the carriages serving to force the grips back into place as soon as the arms $jj$ are relieved from their pressure against the projections K K by the movement of the carriage forward over the saw B.

$l\ l$ are stationary serrations projecting inwardly from the lower side of the other end of the feed-carriages.

M M are dogs or catches, pivoted to the carriages C C at $m$. They are designed to partially revolve the arbors N N as they catch upon corresponding ratchet-wheels on the extremities of the arbors N N immediately below them. The other ends of these arbors are flattened on opposite sides.

O O are horizontal skeleton frames to sustain the shingle-block when loosened from the feed-carriage. They are located at each end of the frame A, and immediately above the arbors N N, and are journaled in the adjustable hubs $p\ p$, which are held in position by set-screws. One end of the frame O rests upon the flattened extremities of the arbors N N, an adjustable screw intervening to regulate the bearing. The other end of the frame O is over the arbors N N, near the ratchet-wheels, and is attached to the frame on which the arbor is journaled by the coiled springs $q\ q$ on each side of the frames, so that as the feed-carriage C is carried forward over the saw B the dog or catch M is brought in contact with one of the four teeth of the ratchet-wheel, which causes a quarter-revolution of the arbor N, thereby alternately raising or lowering the end of the frame O, which is made to bear upon the full or flattened end of the arbor by the action of the coiled springs $q\ q$ at the other end of the frame.

R R are chutes designed to carry away the sawdust without inconvenience to the operator.

In operation, a block of wood is laid upon each of the frames O O, and within the frames of the feed-carriages C C, the thickness of the cut being first regulated by either raising the saw-arbor by means of the adjusting-screw at its lower extremity or adjusting the height of the hubs $p\ p$ of the frames O O. As the shingle-blocks are carried forward toward the saw by the movement of the feed-carriages C C the movable grips I I are gradually pressed against the corresponding ends of each shingle-block by the force of the springs L L, so that the moment the blocks are unsupported by the frames O O they are rigidly clamped between the teeth of the grips I I and the serrations $l\ l$, in which position they are respectively presented to the saw B, over which they are carried sufficiently far to allow the layer which forms the shingle to be cut from the lower side of the blocks, from whence it drops beneath the frame A to the floor below. In this position the shingle-blocks are firmly held until, by the receding of the feed-carriages C C, the pins $i\ i$ of the respective grips I I come again in contact with their corresponding beveled projections, K K, thereby gradually withdrawing the grips I I from the shingle-blocks until, being entirely unclamped, they fall alternately upon the frames O O, which are directly beneath, ready to be again clamped and carried forward to the saw, as before. The alternate raising and lowering of one end of the frame O by means of the dog or catch $m$ acting upon the ratchet-wheel of the arbor N so presents the block to the saw that it cuts the butt-end of the shingle thicker than the other end. The process of sawing is therefore continuous and automatic.

By this arrangement there is no waste of material, as a shingle is formed from the first cut, and no attention of the operator is required after the machine is properly adjusted beyond the supplying the shingle-blocks as rapidly as they are exhausted.

Should it be desired to make the cut of uniform thickness throughout, it is only necessary to throw the dogs or catches M M up, so that they do not act upon their respective ratchet-wheels.

What I claim as my invention, and desire to secure by Letters Patent, is—

1. The combination, in a shingle-machine, of a reciprocating carriage having spring-actuated grips, carried by a sliding bar to clamp the block, and the inclined projections operating to withdraw the grips, with the oscillating frame operated by the shaft provided with cam-faces, substantially as described.

2. In a shingle-machine, the combination of the oscillating frame, the shaft with cam-faces, substantially as described, and the ratchet-and-pawl mechanism adapted to be operated by the carriage, substantially as set forth.

3. The combination, with a shingle-sawing machine having a horizontal saw, of a horizontal sawdust-pipe, as R, arranged at the side of the machine, to inclose the edge of the saw and convey the sawdust therefrom, substantially as described.

In testimony whereof I do affix my signature in presence of two witnesses.

CALVIN J. WELD.

Witnesses:
EDWIN R. POWELL,
CHARLES E. ALLEN.